United States Patent [19]
Pigott

[11] Patent Number: 6,166,451
[45] Date of Patent: Dec. 26, 2000

[54] DISTRIBUTED AIRBAG FIRING SYSTEM AND INTERFACE CIRCUIT THEREFOR

[75] Inventor: John M. Pigott, Phoenix, Ariz.

[73] Assignee: Motorola, Inc., Schaumburg, Ill.

[21] Appl. No.: 09/232,253

[22] Filed: Jan. 14, 1999

[51] Int. Cl.[7] .................................................. H02H 3/20
[52] U.S. Cl. ...................... 307/10.1; 307/10.7; 307/127; 307/138; 320/DIG. 15; 361/245
[58] Field of Search ................... 307/10.1, 127, 307/138, 10.7; 301/245, 246, 77; 320/DIG. 115, DIG. 20

[56] References Cited

U.S. PATENT DOCUMENTS

| | | | |
|---|---|---|---|
| 4,008,473 | 2/1977 | Hinachi et al. | 342/83 |
| 4,139,880 | 2/1979 | Ulmer et al. | 361/246 |
| 4,390,792 | 6/1983 | Meyer et al. | 307/10.7 |
| 4,420,786 | 12/1983 | Toney | 361/77 |
| 5,182,466 | 1/1993 | Ohkubo | 307/127 |

*Primary Examiner*—Albert W. Paladini
*Attorney, Agent, or Firm*—Anthony M. Martinez; Gregory J. Gorrie

[57] ABSTRACT

A distributed airbag firing system (10) includes a controller (12) receiving sensor signals from a sensor (20) over a two-wire bus (18). The controller provides a firing command over to the two-wire bus to a squib driver circuit (26), which provides the firing current necessary to detonate a squib device (32) and inflate the airbag. The squib driver circuit includes a rectifier (42) with its first and second inputs interchangeably connected to the two-wire bus. The rectifier circuit converts the voltage orientation on the first and second conductors to a positive potential on a first output conductor and a negative or ground potential on a second output conductor. The interchangeability of the first and second inputs of the rectifier to the two-wire bus makes the connection arbitrary and fail-safe.

20 Claims, 2 Drawing Sheets

DISTRIBUTED AIRBAG FIRING SYSTEM AND INTERFACE CIRCUIT THEREFOR

BACKGROUND OF THE INVENTION

The present invention relates in general to rectifier circuits and, more particularly, to a rectifier circuit having first and second inputs interchangeably connected to first and second conductors.

Automobile manufacturers regularly include airbags as standard equipment in their vehicles to comply with federal regulations. Sensors placed at strategic locations in the vehicle detect a sudden deceleration or acceleration incident to a collision and provide an electrical signal to a distributed airbag firing system. Upon receiving the sensor signal indicating the sudden deceleration, an airbag controller sends a firing signal to a squib driver circuit. The squib driver circuit is electrically connected to a squib, which is a detonation wire or device used to ignite an explosive charge. There is one squib physically attached to each airbag. When enabled by the firing signal, the squib driver circuit sources a current through the squib to fire the explosive charge. The explosive charge releases a gas that inflates the airbag to protect the occupants of the vehicle during the impact.

The airbag and squib are physically located to protect the occupants, for example, in the steering column, the passenger dashboard, door panels, etc. The sensors are typically located near the points of highest probability of impact generally around the perimeter of the vehicle, e.g. side doors, and front and rear bumpers. The controller module is centrally located, for example, toward the rear of the engine compartment or behind the instrument panel. An electrical wiring harness interconnects the sensors, airbag controller, drivers, and squibs.

The squib driver circuits have first and second inputs electrically connected to the wiring harness to receive the command signal and energy to detonate the squib. The electrical connection is typically a two-wire contact to twisted pair conductors. In the prior art, it is important to make the correct polarity connection for proper operation of the squib driver. If the two-wire connection is reversed from its intended design, the squib firing system may not operate or produce undesired results.

Some prior art distributed firing systems have attempted to color code or mechanically key the two-wire connection terminals to reduce the possibility of incorrect connection. However, such solutions are more expensive to manufacture and still prone to human error. An airbag firing system is an important safety and liability issue and should be made as fail-safe as possible.

Also, because there is the possibility that one of the wires could be accidentally shorted to either vehicle supply (battery) or ground potential, it would be of benefit to be able to continue use the non-shorted wire for signaling. This requires that the system be able to receive signals when the applied polarity is the reverse of that used for normal operation.

Hence, a need exists to simplify and make fail-safe the two-wire connection of the squib driver to a wiring harness of a distributed airbag firing system.

DETAILED DESCRIPTION OF THE PREFERRED EMBODIMENT

Figure 1:
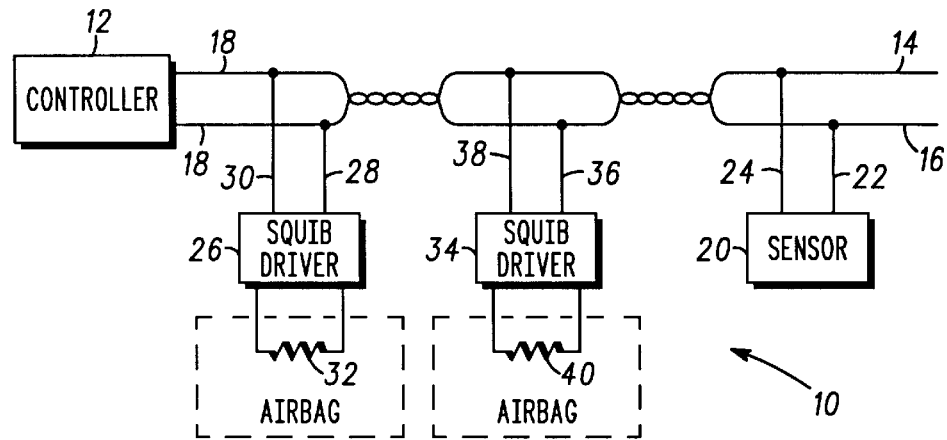
FIG. 1 illustrates a block diagram of an automotive distributed airbag firing system.

Referring to FIG. 1, a distributed firing system 10 is shown suitable for manufacturing as an integrated circuit (IC) using conventional IC manufacturing processes. The distributed firing system 10 is applicable to the automotive and transportation markets for deploying an airbag for occupant safety during a collision. Controller 12 includes a microprocessor or other control circuitry to receive sensor signals and generate waveforms over conductors 14 and 16 to control the squib drivers. Conductors 14 and 16 form a twisted-pair two-wire bus 18, which allows intercommunication between controller 12, the sensors, and the squib drivers. The twisted-pair wires are useful to reduce electromagnetic emissions from the two-wire bus 18.

Sensor 20 is placed at a strategic location in the vehicle to detect a sudden deceleration or acceleration incident to a collision and provide electrical signals to controller 12. Sensor 20 makes a two-wire connection by way of conductors 22 and 24 to conductors 14 and 16. Additional sensors (not shown) are connected to two-wire bus 18.

Squib driver 26 is coupled to two-wire bus 18 by way of conductors 28 and 30. Squib driver 26 receives a command signal from controller 12 and provides a firing signal to squib 32, typically a 2.0 amp current. The command signal is a varying DC signal which transitions between discrete signal levels to convey information to the squib drivers. A useable command signal format is disclosed in U.S. Pat. No. 5,760,489, and incorporated herein by reference. Upon receiving the firing current, squib 32 detonates and inflates an airbag. In a similar manner, squib driver 34 is coupled to two-wire bus 18 by way of conductors 36 and 38. Squib driver 34 receives a command from controller 12 and provides a firing signal to squib 40. Squib 40 detonates and inflates a second airbag. Additional squib drivers are typically connected to two-wire bus 18 to control the operation and deployment of other airbags.

In summary of the distributed firing system 10, sensor 20 detects an acceleration or deceleration incident to a vehicle collision. Sensor 20 sends a sensor signal to controller 12 over twisted two-wire bus 18. Controller 12 processes the sensor signal and determines that one or more airbags should inflate to protect the occupants of the vehicle. Controller 12 sends a fire command over two-wire bus 18 to squib drivers 26 and 34. The squib drivers conduct a 2.0 amp firing current through squibs 32 and 40. Squibs 32 and 40 detonate an explosive charge to release a gas that inflates the respective airbags to protect the occupants during the impact.

Figure 2:
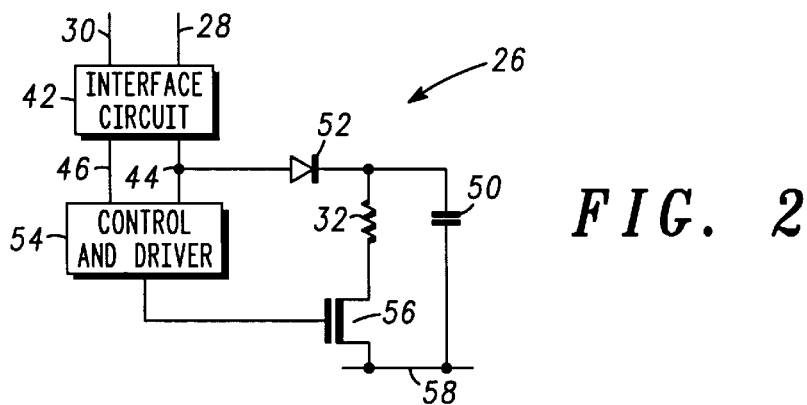
FIG. 2 is a block diagram of a squib driver circuit.

Further detail of squib driver 26 is shown in FIG. 2. Squib driver 34 follows a similar construction and operation. Circuit elements having the same reference number used in prior figures provide a similar function. Squib driver 26 includes a interface circuit 42 which produces a positive signal on conductor 44 and a negative signal or ground signal on conductor 46. The positive signal on conductor 44 charges capacitor 50 through diode 52. Diode 52 is a blocking device and prevents the charge stored on capacitor 50 from leaking back on conductor 44. The signal levels on conductors 44 and 46 are processed through control and driver 54. The proper signal pattern or command from microprocessor 12, in response to the sensor signal from sensor 20, causes control and driver 54 to send a TURN-ON control signal to the gate of transistor 56. The construction and operation of control and driver 54 is known in the art. The source of transistor 56 is coupled to power supply conductor 58 operating at ground potential. When transistor 56 turns on, a 2.0 amp current flows from capacitor 50 through squib 32 and through transistor 56 to ground. The squib fires and inflates the airbag.

As part of present invention, interface circuit 42 allows squib driver 26 to interface to two-wire bus 18 by connecting conductor 28 to conductor 14 and connecting conductor 30 to conductor 16. Alternately, conductor 28 is connected to conductor 16 and conductor 30 is connected to conductor 14 without loss of function of squib driver 26. Thus, the connection of the first and second inputs of squib driver 26 to two-wire bus 18 is arbitrary and interchangeable. The signal levels on conductors 44 and 46 are independent of the connection orientation of conductors 28 and 30 to conductors 14 and 16. In other words, it does not matter to the operation of squib driver 26 whether conductor 28 is coupled to conductor 14 or conductor 16, or whether conductor 30 is coupled to conductor 14 or conductor 16. The user need only randomly connect conductor 28 to either conductor 14 or conductor 16, and then connect conductor 30 to the other conductor of two-wire bus 18. The present invention removes the burden of having to color-code, key, or otherwise verify the proper connection of the squib driver to the two-wire bus.

Figure 3:
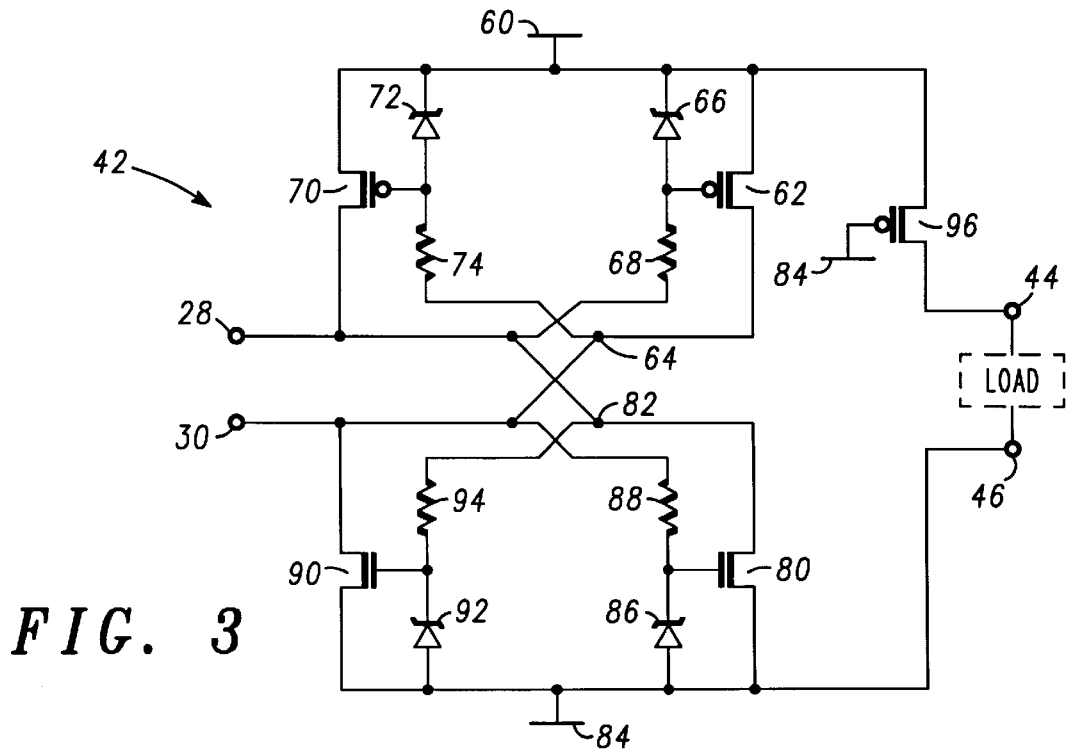
FIG. 3 is a schematic diagram of the rectifier of FIG. 2.

Turning to FIG. 3, further detail of interface circuit 42 is shown. In the following examples, conductor 14 is more positive than conductor 16. Assume conductor 28 is coupled to conductor 16 and conductor 30 is coupled to conductor 14. Conductors 28 and 30 may clip-on to conductors 14 and 16 with no knowledge of the polarity of the twisted two-wire bus. Conductor 28 has a negative or ground potential and conductor 30 has a positive potential. Transistor 62 is a p-channel device. The negative or ground signal on conductor 28 turns on transistor 62 and connects the positive potential on node 64 to power supply conductor 60. Power supply conductor 60 operates at a high potential such as $V_{CC}$=20 volts. Zener diode 66 provides over-voltage protection for the gate of transistor 62. Resistor 68 provides current limit protection for zener diode 66. The positive potential on node 64 turns off p-channel transistor 70. Zener diode 72 provides over-voltage protection for the gate of transistor 70. Resistor 74 provides current limit protection for zener diode 72. Transistors 62 and 70 operate as switching circuits between conductors 30 and 28 and power supply conductor 60, respectively.

The positive signal on conductor 30 turns on transistor 80 and connects the negative or ground potential on node 82 to power supply conductor 84. Transistor 80 is an n-channel device. Zener diode 86 provides over-voltage protection for the gate of transistor 80. Resistor 88 provides current limit protection for zener diode 86. The ground potential on node 82 turns off n-channel transistor 90. Zener diode 92 provides over-voltage protection for the gate of transistor 90. Resistor 94 provides current limit protection for zener diode 92. The signal path is from conductor 30 through transistor 62 to conductor 44. Control and driver 54 and capacitor 50 represent the effective load across conductors 44 and 46. The return signal path from conductor 46 is through transistor 80 to conductor 28. Transistors 80 and 90 operate as switching circuits between conductors 28 and 30 and power supply conductor 84. With conductor 28 connected to conductor 16 and conductor 30 connected to conductor 14, conductor 44 has a positive signal and conductor 46 has a negative or ground signal.

For the alternate configuration, assume conductor 28 is coupled to conductor 14 and conductor 30 is coupled to conductor 16. Conductor 14 is still more positive than conductor 16. Conductor 30 has a negative or ground potential and conductor 28 has a positive potential. The negative or ground signal on conductor 30 turns on transistor 70 and connects the positive potential on node 82 to power supply conductor 60. The positive potential on node 82 turns off p-channel transistor 62. Power supply conductor 60 again operates at a high potential such as $V_{CC}$=20 volts. The positive signal on conductor 28 turns on transistor 90 and connects the ground potential on node 64 to power supply conductor 84. The ground potential on node 64 turns off transistor 80. The signal path is from conductor 28 through transistor 70 to conductor 44. The return signal path from conductor 46 is through transistor 90 to conductor 30. With conductor 28 connected to conductor 14 and conductor 30 connected to conductor 16, conductor 44 has a positive signal and conductor 46 has a negative or ground signal.

An important feature of the present invention is that transistors 62, 70, 80, and 90 are not configured as diodes. The gates of transistors 62, 70, 80, and 90 are coupled to conductors 28 and 30 as shown. The drain-source voltage drop ($V_{DS}$) of transistors 62, 70, 80, and 90 is determined by the current flow and on-resistance of the drain-source conduction path ($R_{DS}$ on). A typical value for VDS is 0.1 volts. The $V_{DS}$ voltage drop would be greater if transistors 62, 70, 80, and 90 were configured as diodes. It is desirable to maintain the voltage loss across interface circuit 42 as small as possible. The smaller $V_{DS}$ voltage loss with the present invention allows most of the applied voltage to be provided to the load because it minimizes the unwanted voltage drops. Thus, a lower supply voltage is required to provide a given load voltage. The lower supply voltage is useful in battery applications.

The connection orientation of the inputs of interface circuits 42 to two-wire bus 18 is arbitrary and interchangeable. Whether conductors 28 and 30 are connected to conductors 14 and 16, or visa versa, conductor 44 remains at a positive potential and conductor 46 remains at a negative or ground potential. Squib driver 26 operates with the first and second inputs of rectifier 42 coupled to either terminal of two-wire bus 18.

As another feature of interface circuit 42, transistor 96 is serially placed in the conduction path of conductor 44. If the voltage on conductors 28 and 30 is less than the turn-on voltage of transistors 62, 70, 80, and 90, then the parasitic diodes of transistors 62, 70, 80, and 90 may conduct injection current into the substrate of the IC if the load is enabled. The gate of transistor receives ground potential from power supply conductor 84, and the source of transistor 96 is connected to power supply conductor 60. Transistor 96 does not conduct until the voltage on power supply conductor 60 and, consequently, the voltage on conductors 28 or 30 is sufficient to turn on transistors 62, 70, 80, and 90. Holding off conduction of transistor 96 until the voltage on power supply conductor 60 is at sufficient level to turn on the switching transistors prevents any substrate injection current.

Figure 4:
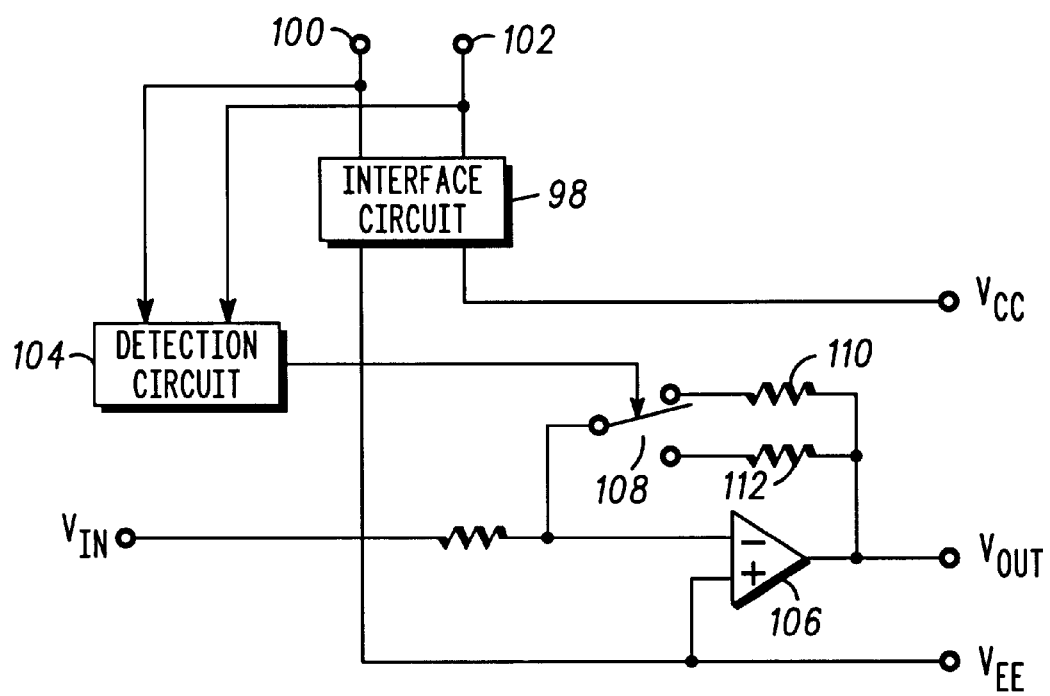
FIG. 4 is a block diagram of an IC configured by the rectifier.

In an alternate embodiment and application, a interface circuit 98, constructed in a similar manner as interface 42, is used to configure ICs via the power supply conductors. In FIG. 4, conductor 100 is the external positive power supply conductor to the IC and conductor 102 is the external negative or ground power supply conductor to the IC. Interface circuit 98 provides a positive power supply $V_{CC}$ and a negative or ground power supply $V_{EE}$ to the internal circuitry of the IC independent of the polarity of signals applied to conductors 100 and 102. If a positive signal is applied to conductor 100 and a negative signal is applied to conductor 102, then a detection circuit 104 senses the polarity of the applied signals. Detection circuit 104 configures the IC according to the polarity of the power supply signals. If a negative signal is applied to conductor 100 and a positive signal is applied to conductor 102, then detection circuit 104 senses the opposite orientation.

In one example, the detection circuit configures an operational amplifier 106 as a comparator with a first orientation of the power supply, e.g. conductor 100 positive with respect to conductor 102. Detection circuit 104 configures operational amplifier 106 as a linear amplifier with a second orientation of the power supply, e.g. conductor 102 positive with respect to conductor 100. The different configurations of the IC is achieved by the output signal of detection circuit 104 controlling switching circuit 108 to change the feedback resistance of amplifier 106. Switching circuit 108 is a configuration circuit that alters the configuration or operation of the IC. The internal power supply to the IC remains set to have a positive and negative orientation on conductors $V_{CC}$ and $V_{EE}$, respectively, as described above.

In a digital application, the orientation of the power supply conductors can configure a timer circuit in an IC to operate as a one-shot multi-vibrator with a first orientation of the power supply signals and as a continuous oscillator with a second orientation of the power supply signals.

In summary, the present invention provides a distributed airbag firing system including a controller receiving sensor signals from a sensor over a two-wire bus. The controller provides a firing command over to the two-wire bus to a squib driver circuit, which provides the firing current necessary to detonate a squib device and inflate the airbag. The squib driver circuit includes a interface with its first and second inputs interchangeably connected to the two-wire bus. The rectifier circuit converts the voltage orientation on the first and second conductors to a positive potential on a first output conductor and a negative or ground potential on a second output conductor. The interchangeability of the first and second inputs of the rectifier to the two-wire bus makes the connection arbitrary and fail-safe. A benefit of having a polarity reversal system is that it makes recovery in case of an inadvertent short circuit easier. If one of the lines is shorted to either ground or supply, the other can still be driven and provide the correct signals to the squib driver. The rectifier can also be used to change the functional configuration of an IC based on the polarity of the power supply signals.

What is claimed is:

1. An interface circuit having first and second inputs and first and second outputs, comprising:
   a first switching circuit (70) having a first conduction terminal coupled to the first input, a second conduction terminal coupled to the first output; a control input coupled to the second input through a current limiting circuit, and an over-voltage protection circuit coupled between the control input and the second conduction terminal; and
   a second switching circuit (90) having a first conduction terminal coupled to the second input, a second conduction terminal coupled to the second output, a control input coupled to the first input through a current limiting circuit, and an over-voltage protection circuit coupled between the control input and the second conduction terminal,
   wherein the second conduction terminal of the first switching circuit couples with a power supply terminal for receiving a positive potential, and
   wherein when the first input receives a positive signal with respect to the second input, the first output is coupled with the power supply terminal, and
   wherein when the second input receives a positive signal with respect to the first input, the first output is coupled with the power supply terminal.

2. The interface circuit of claim 1 further comprising:
   a third switching circuit (62) having a first conduction terminal coupled to the second input, a second conduction terminal coupled to the first output, a control input coupled to the first input through a current limiting circuit, and an over-voltage protection circuit coupled between the control input and the second conduction terminal; and
   a fourth switching circuit (80) having a first conduction terminal coupled to the first input, a second conduction terminal coupled to the second output, a control input coupled to the second input through a current limiting circuit, and an over-voltage protection circuit coupled between the control input and the second conduction terminal.

3. The interface circuit of claim 2, further including an output switching transistor (96) having first and second conduction terminals serially coupled in a conduction path of the first output, and a control terminal coupled the power supply terminal for receiving said positive potential.

4. The interface circuit of claim 3, wherein the first switching circuit includes a first p-channel transistor (70) having a source coupled to the first output, a drain coupled to the first input, and a gate coupled to the second input, the first transistor being a p-channel device.

5. The interface circuit of claim 4, wherein the second switching circuit includes a second transistor (90) having a source coupled to the second output, a drain coupled to the second input, and a gate coupled to the first input, the second transistor being an n-channel device.

6. The interface circuit of claim 5, wherein the third switching circuit includes a third transistor (62) having a source coupled to the first output, a drain coupled to the second input, and a gate coupled to the first input, the third transistor being a p-channel device.

7. The interface circuit of claim 6, wherein the fourth switching circuit includes a fourth transistor (80) having a source coupled to the second output, a drain coupled to the first input, and a gate coupled to the second input, the fourth transistor being an n-channel device.

8. The interface circuit of claim 7 wherein the over-voltage protection circuits are (72) coupled between the gate of one of the first, second, third, and fourth transistors and one of the first and second outputs.

9. The interface circuit of claim 8 wherein the current limiting circuits are (74) coupled between the gate of one of the first, second, third, and fourth transistors and one of the first and second inputs.

10. A distributed airbag firing system, comprising:
    first and second conductors coupled for receiving first and second control signals; and
    a squib driver circuit having first and second inputs interchangeably connected to the first and second conductors, the squib driver circuit having first and second outputs
    wherein when the first input of the squib driver receives a positive signal with respect to the second input, the first output is coupled with a positive power supply terminal, and
    wherein when the second input of the squib driver receives a positive signal with respect to the first input, the first output is coupled with the positive power supply terminal.

11. The distributed airbag firing system of claim 10, wherein the squib driver circuit includes:

an interface circuit having first and second inputs interchangeably coupled to the first and second conductors; and a control circuit having first and second inputs coupled to first and second outputs of the interface circuit, respectively, and further including first and second outputs for providing a firing squib signal.

12. The distributed airbag firing system of claim 11, wherein the interface circuit includes:

a first switching circuit (70) having a first conduction terminal coupled to the first input, a second conduction terminal coupled to the first output, and a control input coupled to the second input;

a second switching circuit (90) having a first conduction terminal coupled to the second input, a second conduction terminal coupled to the second output, and a control input coupled to the first input;

a third switching circuit (62) having a first conduction terminal coupled to the second input, a second conduction terminal coupled to the first output, and a control input coupled to the first input; and a fourth switching circuit (80) having a first conduction terminal coupled to the first input, a second conduction terminal coupled to the second output, and a control input coupled to the second input, wherein the second conduction terminal of the first switching circuit couples with a power supply terminal for receiving a positive potential.

13. An integrated circuit for supplying a firing signal to a squib detonation device, the integrated circuit comprising:

an interface circuit having first and second inputs interchangeably coupled to first and second conductors; and a control and driver circuit having first and second inputs coupled to first and second outputs of the interface circuit, respectively, and further having first and second outputs for providing the firing signal, wherein when the first input of the interface circuit receives a positive signal with respect to the second input, the first output is coupled with a positive power supply terminal providing a positive power supply signal on the first input of the control and driver circuit, and wherein when the second input of the interface circuit receives a positive signal with respect to the first input, the first output is coupled with the positive power supply terminal providing a positive power supply signal on the first input of the control and driver circuit.

14. The integrated circuit of claim 13, wherein the interface circuit includes:

a first switching circuit (70) having a first conduction terminal coupled to the first input, a second conduction terminal coupled to the first output, and a control input coupled to the second input;

a second switching circuit (90) having a first conduction terminal coupled to the second input, a second conduction terminal coupled to the second output, and a control input coupled to the first input;

a third switching circuit (62) having a first conduction terminal coupled to the second input, a second conduction terminal coupled to the first output, and a control input coupled to the first input; and a fourth switching circuit (80) having a first conduction terminal coupled to the first input, a second conduction terminal coupled to the second output, and a control input coupled to the second input, wherein the second conduction terminal of the first switching circuit couples with a power supply terminal for receiving a positive potential.

15. The integrated circuit of claim 14, wherein the first switching circuit includes a first transistor having a source coupled to the first output, a drain coupled to the first input, and a gate coupled to the second input.

16. The integrated circuit of claim 15, wherein the second switching circuit includes a second transistor having a source coupled to the second output, a drain coupled to the second input, and a gate coupled to the first input.

17. The integrated circuit of claim 16, wherein the third switching circuit includes a third transistor having a source coupled to the first output, a drain coupled to the second input, and a gate coupled to the first input.

18. The integrated circuit of claim 17, wherein the fourth switching circuit includes a fourth transistor having a source coupled to the second output, a drain coupled to the first input, and a gate coupled to the second input.

19. The integrated circuit of claim 18 further comprising:

an over-voltage protection circuit coupled between the gate of one of the first, second, third, and fourth transistors and one of the first and second outputs; and a current limiting circuit coupled between the gate of one of the first, second, third, and fourth transistors and one of the first and second inputs.

20. A method of interchangeably connecting first and second inputs of a squib driver circuit to first and second control conductors in an airbag deployment system, comprising the steps of:

arbitrarily connecting the first input of the squib driver circuit to the first control conductor; and connecting the second input of the squib driver circuit to the second control conductor, wherein when the first input receives a positive signal with respect to the second input, the first output is provided with a positive voltage from a power supply terminal to provide an airbag firing signal, and wherein when the second input receives a positive signal with respect to the first input, the first output is provided with a positive voltage from a power supply terminal to provide the airbag firing signal.

* * * * *